Aug. 18, 1931.  L. F. WILSON  1,819,310

COMBINED COMPASS AND LIGHT

Filed Dec. 21, 1928

Front of vehicle

Patented Aug. 18, 1931

1,819,310

UNITED STATES PATENT OFFICE

LYNDON F. WILSON, OF CHICAGO, ILLINOIS

COMBINED COMPASS AND LIGHT

Application filed December 21, 1928. Serial No. 327,491.

This invention pertains to direction indicating instruments and the like and more particularly to a combination compass and light peculiarly adapted for location overhead in airplanes, airships, sailing vessels, automobiles, etc.

A primary object of the invention is to provide a novel arrangement of a compass with a light so that at least the general direction of travel may be observed at all times.

Another object is to provide a combination dome light and compass so arranged that while the compass remains useful for its purposes the effective light rays for general lighting purposes are not materially reduced.

Figure 1:
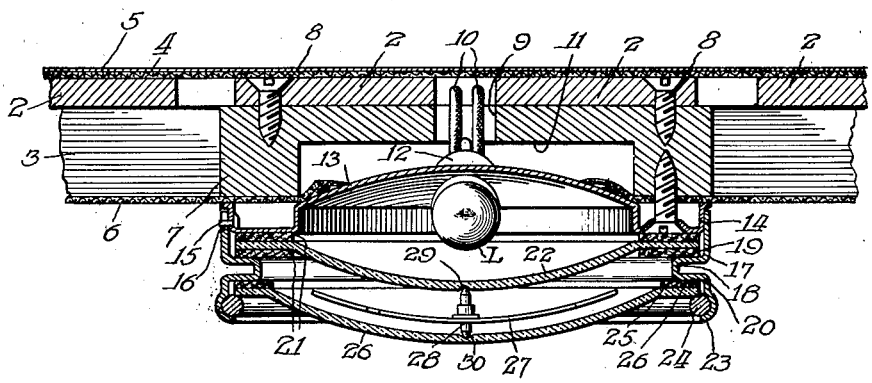
Figure 2:
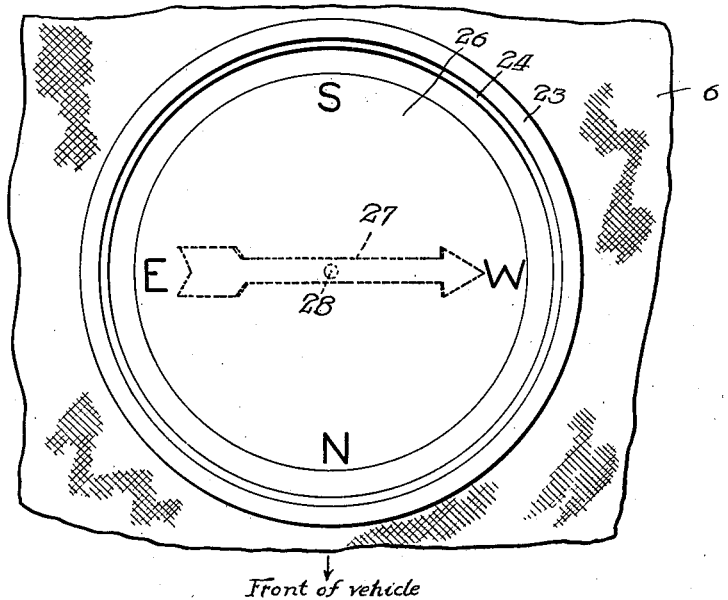

Many other objects as well as the advantages and uses of the invention will be or should become readily appreciated and understood after reading the following description and claims, and after viewing the drawings in which:

Fig. 1 is a longitudinal sectional view of a preferred form of the invention showing its application to a dome light of an automobile, a fragment of the top of the automobile being shown, and Fig. 2 is a bottom or front plan view of the same.

The invention in its preferred form is illustrated in Fig. 1 as applied in connection with the dome light of an automobile. The construction of the top of the vehicle or the support to which the light and compass are attached is more or less immaterial, but in the embodiment illustrated comprises longitudinal or fore and aft frame members 2 secured to suitable transverse members or joists 3 with a suitable external fabric covering 4 upon which a waterproof dressing 5 is placed and a suitable internal fabric covering 6. Between a pair of transverse members or joists 3 a mounting block 7 is disposed and secured, as for instance, by screws 8. The block 7 has an aperture 9 centrally of its base passage for lead-in wires to the lamp L and is recessed out as shown at 11 for reception of the lamp L, its socket 12 and reflector 13.

The reflector 13 in the embodiment illustrated is provided with an embossed or flanged rim 14 which may be provided with pins or lugs 15 adapted to be received in suitable slots 16 in one end of a casing member 17, the pins 15 and slots 16 forming a bayonet joint connection for ready removability of the casing and other parts. The casing 17 may be provided with an inwardly spun or bent portion 18 providing circumferential rearwardly and forwardly facing shoulders 19 and 20 respectively.

Mounted between the reflector flange 14 and shoulder 19 and between suitable washers 21 such as felt is a concavo-convex plate of transparent glass or other material 22. The casing 17 at its front, outer or lower end is provided with a flange 23 of arcuate cross section for the purpose of receiving and retaining a split spring ring 24 between which and a gasket or felt washer 25 which abuts against the forwardly facing shoulder 20, a concavo-convex translucent glass plate 26 is disposed and held.

The glass or other suitable material plates or lenses 22 and 26 are arranged in spaced relation to one another by reason of the arrangement and construction of the casing 17 and the fact that in the present illustrated embodiment the radii of curvature of the concavo-convex portions of the plates are substantially the same. In the space between the plates 22 and 26 a compass needle 27 is mounted on a pivot pin which has point bearings in axially aligned counter-sunk recesses 29 and 30 formed in the outer face of the plate 22 and the inner face of the plate 26 respectively. By so mounting the needle pivot, that is, mounting it directly against the glass in the illustrated form, jewel bearings for the needle are provided so that it may swing with utmost freedom. The needle, of course, is preferably curved on approximately the same radius of curvature of the glass plates to avoid the possibility of its engaging either of the plates.

The plate 26 is translucent, but preferably is not transparent in order to provide a diffused light. This end may be attained by frosting the outer or inner surface of the plate 26. On the interior surface of this plate adjacent, but radially inward of the inner edge of the gasket 25, the legends or indicia N, E, S and W are painted or otherwise placed thereon. These legends or indicia are, of course, opaque so that the light rays from the lamp L will outline them with a reasonable degree of sharpness. The needle is also opaque and the light rays from the lamp L will cast a shadow of the needle on the lower plate 26 so that the direction in which the needle points will be apparent to the observer.

The legend "N" is preferably located so as to be directed normally toward the front of the vehicle (as shown in the drawings), but it may be located in any convenient place of reference. In Fig. 2 of the drawings the compass position is that assumed when the vehicle has been swung to and headed directly toward the west. If desired any of the ordinary means for correcting or compensating the compass may be employed as will be understood.

It will be clear that while I have illustrated and described the invention as applied to a dome light of an automobile, it may be applied to the dome lights of other conveyances such as airplanes, motor boats or other sailing vessels and so forth. Therefore, where in the description and claims I have used the term vehicle it is meant to include any and all of the conveyances to which the invention is applicable. Though I have illustrated and described a preferred form of the invention it will be appreciated that many changes in construction and arrangement may be made therein without departing from the spirit of the invention or the scope of the appended claims.

I claim:

1. In a vehicle, a source of light, a transparent plate in front of said light, a translucent plate in front of said transparent plate and in spaced relation thereto, and a compass needle pivotally mounted between said plates.

2. In a vehicle, a dome light, a transparent glass plate in front of said light, a translucent glass plate in front of said transparent plate, said plates having pivot bearings formed therein, and a magnetized element having pivots pivoted in said bearings.

3. In a vehicle, a dome light, a transparent glass plate in front of said light, a translucent glass plate in front of said transparent plate and spaced therefrom, each of said plates having a counter-sunk recess in one side, said recesses being on facing sides of the plates and in alignment, and a magnetic needle having a pivot pin pivotally mounted in said recesses.

4. In a vehicle, a dome light, a transparent glass plate in front of said light, a translucent glass plate in front of said transparent plate and spaced therefrom, each of said plates having a counter-sunk recess in one side, said recesses being on facing sides of the plates and in alignment, and a magnetic needle having a pivot pin pivotally mounted in said recesses, said translucent plate having opaque indicia thereon.

5. A combination vehicle dome light and compass comprising a source of light, a pair of light transmitting diaphragms in spaced relation to one another in front of said light and a compass element pivotally mounted for swinging movements between said diaphragms.

6. A combination vehicle dome light and compass comprising a light, a pair of light transmitting plates arranged in front of said light and in spaced substantially registering positions with respect to one another, and a magnetized compass element pivotally mounted on and between said plates.

7. The combination with a vehicle dome light having a light and a light transmitting dial in front thereof, of a magnetized compass needle pivotally mounted between said light and said dial, a mounting block for said light, needle, and dial and means for securing said mounting block to the interior of a vehicle.

In witness of the foregoing I affix my signature.

LYNDON F. WILSON.